United States Patent [19]

Tesch et al.

[11] Patent Number: 4,607,069
[45] Date of Patent: Aug. 19, 1986

[54] CURABLE COMPOSITIONS BASED ON EPOXY RESINS

[75] Inventors: Helmut Tesch, Birkenheide; Manfred Heym, Weisenheim; Walter Doerflinger, Frankenthal; Herbert Stutz, Karlsruhe; Peter Neumann, Wiesloch; Dietmar Nissen; Gerhard Schaefer, both of Heidelberg, all of Fed. Rep. of Germany

[73] Assignee: BASF Aktiengesellschaft, Ludwigshafen, Fed. Rep. of Germany

[21] Appl. No.: 751,389

[22] Filed: Jul. 3, 1985

[30] Foreign Application Priority Data

Jul. 5, 1984 [DE] Fed. Rep. of Germany ....... 3424700

[51] Int. Cl.⁴ ............................................. C08G 59/50
[52] U.S. Cl. .................................... 523/400; 523/466; 523/468; 525/423; 528/88; 528/91; 528/118; 528/124; 528/220
[58] Field of Search ................. 528/118, 124, 220, 88, 528/91; 523/400, 466, 468; 525/423

[56] References Cited

U.S. PATENT DOCUMENTS 3,288,753 11/1966 Winfield et al. ................... 528/124
3,996,175 12/1976 Schreiber et al. ................... 523/427

Primary Examiner—Earl Nielsen
Attorney, Agent, or Firm—Keil & Weinkauf

[57] ABSTRACT

A solvent-free curable composition has a long shelf life and consists of

A 100 parts by weight of an epoxy resin and
B from 10 to 100 parts by weight of, as a curing agent for the epoxy resin, an aromatic diamine containing

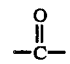

groups, with or without
C from 0.01 to 5 parts by weight of an accelerator, the curing agent for the epoxy resin being finely dispersed in the latter and preferably having a particle size of less than 10 μm. The preferred epoxy resin curing agent is 4,4'-diaminodiphenyl ketone. The curable composition is used in particular for the preparation of fiber-reinforced materials.

5 Claims, No Drawings

CURABLE COMPOSITIONS BASED ON EPOXY RESINS

The present invention relates to a curable composition which consists of an epoxy resin, a curing agent and an accelerator and has a long shelf life, and to a process for the preparation of highly thermally stable fiber-reinforced materials by impregnating reinforcing fibers with this curable composition and curing the resin.

In the preparation of fiber-reinforced materials from epoxy resins, the curing agents usually employed are soluble in the epoxy resin, e.g. diamines and dicarboxylic anhydrides. The disadvantage of such single-phase systems is that their shelf life at room temperature is restricted to from a few days to a few weeks. Epoxy resin curing agents which are insoluble in the epoxy resin at room temperature and go into solution only at elevated temperatures are particularly suitable for the preparation of single-component systems having a long shelf life. Fiber impregnation is usually carried out using a solution of an epoxy resin and a curing agent in a solvent (JP-A-54-064 599). The disadvantage of this procedure is that, after the fibers have been impregnated, the solvent has to be removed and recovered. Moreover, impregnation of fibers with a solution has an adverse effect on the properties of the laminate. Traces of residual solvent which have not been removed from the prepreg result in pore formation in the laminate. Furthermore, non-uniform distribution of the fibers in the prepreg is observed, which also has an adverse effect on the quality of the laminate.

Homogeneous, solvent-free mixtures of epoxy resins and 4,4'-diaminodiphenyl ketone can be produced by preparing mixtures of the epoxy resin and powdered diamine and converting the mixture to a solution by heating at above 150° C. (U.S.-A-3,288,753) or by ultrasonic treatment (W. T. Hodger and T. L. St. Clair, SAMPE, Quarterly, April 1983, pages 46–50). However, a reaction between the epoxy resin and the diamine takes place even at this stage, so that relatively highly viscous mixtures are obtained which can no longer be processed to fiber-reinforced prepregs exhibiting sufficient tack at room temperature.

Attempts to carry out impregnation using an epoxy resin melt in which diamine powders of the usual particle size (i.e. about 20–100 um) are dispersed result in nonhomogeneous reinforced materials possessing unsatisfactory mechanical properties. Particularly in the preparation of prepregs by the resin film transfer method, in which a thin melt film of about 80–100 μm is applied onto a paper base and the reinforcing fibers are pressed into this film, the disadvantages of coarsely dispersed particles in the epoxy resin melt are clear. The resulting melt film is inhomogeneous, making it impossible to achieve uniform fiber impregnation.

The quality of reinforced materials possessing an epoxy resin matrix and coarsely crystalline curing agent particles is furthermore adversely affected by virtue of the fact that the chemical reaction between the epoxy resin and the curing agent comes to a stop at the phase boundary, as a result of the system undergoing a transition from the liquid to the glassy state, before the large crystals of the curing agent can react.

It is an object of the present invention to provide an essentially solvent-free curable composition which is based on an epoxy resin and an aromatic diamine as a curing agent and has a long shelf life. It is a further object of the present invention to prepare fiber-reinforced materials based on epoxy resins, wherein the curing agents to be used are keto-containing aromatic diamines which are insoluble in the epoxy resin at low temperatures. The materials obtained should have good mechanical properties and high heat distortion resistance.

We have found that this object is achieved by an essentially solvent-free curable composition which has a long shelf life and consists of A 100 parts by weight of an epoxy resin and B from 10 to 100 parts by weight of an aromatic diamine containing

groups, with or without

C from 0.01 to 5 parts by weight of an accelerator, the curing agent for the epoxy resin being finely dispersed in the latter and preferably not less than 90% by volume of the particles having a particle size of less than 10 μm.

Epoxy resins are low molecular weight and high molecular weight compounds possessing terminal epoxide groups, epoxide side groups or epoxide groups incorporated in cyclic systems. They can be liquid, semi-solid or solid. Preferred compounds are those which contain more than one epoxide group per molecule, preferred epoxy resins being reaction products of polyfunctional alcohols, phenols, cycloaliphatic carboxylic acids, aromatic amines or aminophenols with epichlorohydrin, as well as cycloaliphatic epoxides and cycloaliphatic epoxide esters. Mixtures of different epoxy resins may also be used. Bisphenol A diglycidyl ether, tetraglycidyldiaminodiphenylmethane and epoxidized novolaks are particularly preferred. The resins may contain the conventional diluents, such as phenyl glycidyl ether or butyl glycidyl ether.

The curable composition contains from 10 to 100, preferably from 20 to 60, parts by weight of the epoxy resin curing agent per 100 parts by weight of epoxy resin, the said curing agent being dispersed in the epoxy resin in the form of a pulverulent, insoluble solid and preferably having a mean particle size of less than 10 μm, in particular less than 5 μm, i.e. more than 90%, in particular more than 95%, of the particles have a diameter of less than 10 μm, preferably less than 5 μm. Such a finely divided powder can be prepared, for example, by milling a coarser powder in an air jet mill. The finely divided powder is mixed into the epoxy resin in mixing units equipped with dissolver disk stirrers. However, it is also possible to carry out wet-milling by milling the fairly coarse powder in the presence of the liquid epoxy resin in a stirred ball mill. In this procedure, in contrast to dry-milling followed by dispersing, the mixture used for impregnating the reinforcing fibers is prepared in one operation. Dispersing of the dry-milled powder, or the wet-milling in a stirred ball mill, is carried out at temperatures at which the curing agent has gone into solution in the epoxy resin only to a very small extent if at all.

Suitable curing agents for epoxy resins are aromatic diamines which contain

groups and are insoluble in the particular epoxy resin at low temperatures. Preferred diamines are those of the formula

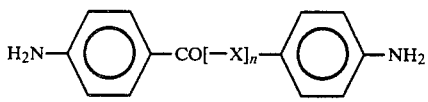

where n is 0 or 1 and X is 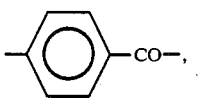

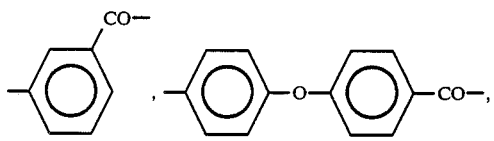

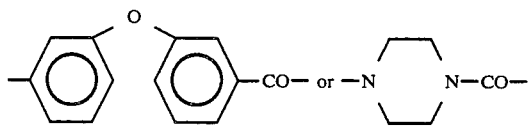

in particular 4,4'-diaminodiphenyl ketone.

It is also possible to use mixtures of these diamines, as well as mixtures of the novel diamines with minor amounts of other, preferably aromatic, diamines, e.g. with 4,4'-diaminodiphenylmethane or 4,4'-diaminodiphenyl sulfone. Such mixtures of curing agents are advantageous when, for example, the viscosity of the mixture of the epoxy resin and the insoluble diamine is too low to permit preparation of the prepreg, i.e. when the prepreg is too tacky. In this case, it is possible to bring the resin to a suitable consistency by adding small amounts of soluble diamines which react with the epoxy resin at a low temperature.

The curable mixture may furthermore contain from 0.01 to 5, preferably from 0.1 to 2, parts by weight of a curing accelerator per 100 parts by weight of epoxy resin. Examples of suitable compounds of this type are boron trifluoride monoethylamine and salicylic acid. If not only the curing agent but also the accelerator is insoluble in the epoxy resin, the accelerator too should have particles possessing a diameter of less than 5 μm.

The curable compositions may furthermore contain conventional additives, such as pigments, fillers, plasticizers, flameproofing agents and non-volatile extenders. They should be as free of solvents as possible, these having to be removed after application onto the reinforcing fibers. However, a small amount of solvents, preferably less than 5 parts by weight, in particular less than 1 part by weight, per 100 parts by weight of epoxy resin may be present. The curable mixtures can also contain thermoplastic poLymers in order to increase the viscosity. This prevents bleeding of the resin during hardening of the laminate.

The novel curable compositions are useful for the production of moldings, adhesives and coatings, but are preferably used for fiber-reinforced materials.

The present invention accordingly furthermore relates to a process for the preparation of fiber-reinforced materials by impregnating from 70 to 30% by volume of reinforcing fibers with from 30 to 70% by volume of the novel curable composition. To do this, the curable composition is applied onto the reinforcing fibers, which may be in the form of continuous filaments, slivers, mats or fabrics or webs and consist of glass, carbon or aramid.

The epoxy resin compositions are cured by heating. The curing temperature depends on the type of epoxy resin, the type of curing agent and the type of accelerator and can vary within wide limits from 120° to 250° C. preferably from 150° to 200° C.

In the Examples, parts and percentages are by weight.

EXAMPLES

1. Milling of amine curing agents in an air jet mill.

4,4'-Diaminodiphenyl ketone (I) is milled in a spiral jet mill. The principle of jet milling is described by Rink and Giersiepen in Aufbereitungs-Technik No. 9/1971, pages 567–569, where a diagram of a jet mill is given. The mill used has a grinding chamber of 170 mm diameter and 15 mm height. The pressure of the injected air is 8 bar, and the product throughput is 2 kg/h.

The particle size distribution after the milling procedure is measured by means of laser diffraction (particle sizer from MALVERN). To do this, the powder is dispersed in a hydrocarbon mixture (Sedisperse—A 11 from COULTOR) for 10 minutes with the aid of an ultrasonic probe (P=125 W).

Particle size distribution (cumulative volume distribution):

95% by volume of the particles have a diameter of less than 3.0 μm,
80% by volume ≦2.1 μm,
65% by volume ≦1.6 μm and
50% by volume 1.3 μm.

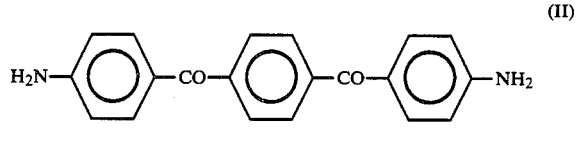

(II)

and

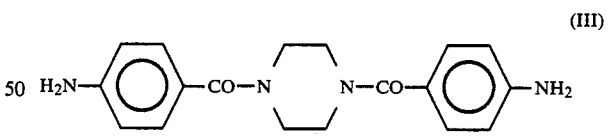

(III)

are milled in a similar manner.
Particle size distribution:

|  |  | II | III |
|---|---|---|---|
| 95% by volume | ≦ | 5.0 μm | 3.4 μm |
| 80 |  | 3.3 μm | 2.4 μm |
| 65 |  | 2.9 μm | 1.9 μm |
| 50 |  | 2.6 μm | 1.5 μm |

2. Preparation of the curable compositions.

Tetraglycidyldiaminodiphenylmethane (MY 720 from CIBA-GEIGY) is initially taken at 95° C. in a cylindrical mixing vessel (diameter 100 mm) equipped with a high-speed dissolver disk stirrer (diameter of the dissolver disk 30 mm). 39 parts by weight of jet-milled I having a particle size distribution described in Example 1, per 100 parts by weight of MY 720, is mixed in over 5 minutes, the speed of the dissolver disk stirrer being 500 rpm. The curing agent is then dispersed in the mixture for 30 minutes at 95° C. and at a stirrer speed of 2,000 rpm, after which the mixture is devolatilized and cooled to room temperature.

By using the TAS-plus image analysis system from LEITZ to carry out measurements on 10 μm films from the mixtures applied by knife-coating, it was found that the particle size distribution of the curing agent dispersed in the epoxy resin showed good agreement with the distribution of the dry-milled powder.

Stability during storage at room temperature:

The viscosity increases from 78,800 to only 80,200 mPas in the course of 90 days (measurement in a CONTRAVES 15T rotational viscometer at 50° C.).

Stability during storage at 80° C.:

The viscosity increases from 3,180 to 3,320 mPas in the course of 8 hours.

Mixtures prepared for comparison from epoxy resins and coarsely crystalline I (particle sizes up to about 100 μm) or epoxy resins and dissolved amine curing agents, such as 4,4'-diaminodiphenyl sulfone, do not possess the superior properties of the claimed mixture. In mixtures containing coarsely crystalline particles of the curing agent, the latter settles out; homogeneous films about 50–100 μm thick for the production of prepregs (cf. Example 3) are not obtained. Mixtures containing dissolved curing agents do not possess the good stability properties.

3. Preparation of the fiber-reinforced materials.

The curable mixture prepared in Example 2 is heated to 70° C. and applied onto a paper base by means of a knife coater. Parallel carbon fiber rovings (T 300, 6,000×50 B from TORAY) are then laid on the resin film and pressed into the resin by means of heated calenders, the fiber strands being impregnated with the resin melt so that no air bubbles are present.

The resulting prepreg (resin content 35% by weight) has a shelf life of several months at room temperature without losing its tack or drapeability.

To produce a laminate, 8 or 16 prepreg layers are placed one on top of the other with a unidirectional fiber arrangement at room temperature, and are then placed in a sheet mold preheated to 140° C., and subjected to a preliminary curing under 15 bar for 2 hours. The material is then post-cured at 180° C. for 6 hours and cooled to give a 1 or 2 mm thick laminate having a fiber content of 60±2% by volume and the following mechanical properties at 23° C. (tests carried out according to DIN No. 29,971; tensile test parallel to the fiber direction on 1 mm laminate, other tests on 2 mm laminate):

| | |
|---|---|
| Tensile strength parallel to the fiber direction | 1,490 N/mm² |
| Tensile modulus of elasticity parallel to the fiber direction | 135,000 N/mm² |
| Elongation at break parallel to the fiber direction in the tensile test | 1.0% |
| Tensile strength perpendicular to the fiber direction | 58 N/mm² |
| Tensile modulus of elasticity perpendicular to the fiber direction | 10,900 N/mm² |
| Elongation at break perpendicular to the fiber direction in the tensile test | 0.5% |
| Flexural strength parallel to the fiber direction | 1,730 N/mm² |
| Flexural modulus parallel to the fiber direction | 122,000 N/mm² |
| Outer fiber elongation at break parallel to the fiber direction | 1.6% |
| Compressive strength parallel to the fiber direction | 1,390 N/mm² |
| Compressive modulus parallel to the fiber direction | 140,000 N/mm² |
| Compressive strain parallel to the fiber direction | 1.3% |
| Shear strength in the plane of the laminate | 99 N/mm² |
| Shear modulus in the plane of the laminate | 5,880 N/mm² |
| Elongation at break in the plane of the laminate | 2.0% |
| Interlaminar shear strength | 92.2 N/mm² |
| Glass transition temperature (DIN 53,445) | 267° C. |

We claim:

1. An essentially solvent-free curable composition which has a long shelf life and consists of
   A 100 parts by weight of an epoxy resin and
   B from 10 to 100 parts by weight of, as a curing agent for the epoxy resin, an aromatic diamine containing

groups, with or without
   C from 0.01 to 5 parts by weight of an accelerator, wherein the curing agent for the epoxy resin is finely dispersed in the latter.

2. A curable composition as claimed in claim 1, wherein not less than 90% by volume of the particles of the curing agent for the epoxy resin have a particle size of less than 10 um.

3. A curable composition as claimed in claim 1, wherein the epoxy resin curing agent used is a diamine of the formula

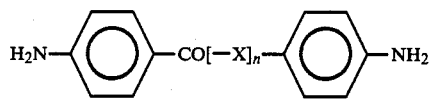

where n is 0 or 1 and X is

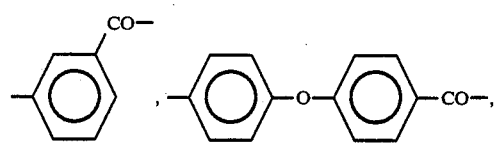

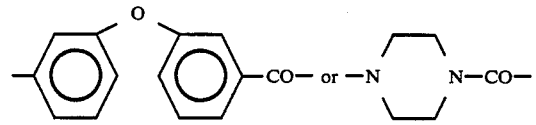

4. A curable composition as claimed in claim 1, wherein the epoxy resin curing agent used is 4,4'-diaminodiphenyl ketone.

5. A process for the preparation of a fiber-reinforced material by impregnation of from 70 to 30% by volume of reinforcing fibers with from 30 to 70% by volume of a curable composition as claimed in claim 1.

* * * * *